United States Patent
Omar

Patent Number: 5,388,863
Date of Patent: Feb. 14, 1995

[54] METHOD AND APPARATUS FOR JOINING IN-SITU CEMENT-MORTAR LINED PIPELINES

[75] Inventor: Ahmed A. Omar, Dhahran, Saudi Arabia

[73] Assignee: Saudi Arabian Oil Company, Dhahran, Saudi Arabia

[21] Appl. No.: 95,098

[22] Filed: Jul. 20, 1993

[51] Int. Cl.$^6$ .................. F16L 58/06; F16L 13/02
[52] U.S. Cl. .................. 285/55; 285/286; 285/149; 228/214
[58] Field of Search .......... 285/55, 149, 45, 286, 285/291; 228/175, 189, 214

[56] References Cited

U.S. PATENT DOCUMENTS

| | | | |
|---|---|---|---|
| Re. 22,725 | 2/1946 | von Ahrens | 285/111 |
| 2,037,962 | 4/1936 | Brown | 285/111 |
| 2,762,904 | 9/1956 | Thomas | 219/104 |
| 2,895,747 | 7/1959 | Bland et al. | 285/21 |
| 3,129,961 | 4/1964 | Danko et al. | 285/230 |
| 3,325,191 | 6/1967 | Yates | 285/55 |
| 3,677,580 | 7/1972 | Klanke | 285/184 |
| 4,027,901 | 6/1977 | Forni | 285/55 |
| 4,556,240 | 12/1985 | Yoshida | 285/55 |
| 4,611,833 | 9/1986 | Leslaut | 285/55 |
| 4,640,532 | 2/1987 | Pope | 285/41 |
| 4,681,349 | 7/1987 | Press et al. | 228/214 |
| 4,780,072 | 10/1988 | Burnette | 285/55 |
| 4,883,292 | 11/1989 | Kuroki | 285/55 |
| 4,913,465 | 4/1990 | Abbema et al. | 285/55 |
| 5,069,485 | 12/1991 | Allen et al. | 285/55 |
| 5,104,152 | 4/1992 | Galfant | 285/47 |
| 5,163,715 | 11/1992 | Rickard et al. | 285/55 |
| 5,219,187 | 6/1993 | Mikitka | 285/55 |

*Primary Examiner*—Eric K. Nicholson
*Attorney, Agent, or Firm*—Davis Hoxie Faithfull & Hapgood

[57] ABSTRACT

This invention is a method for joining sections of in-situ cement-mortar lined pipes adapted for high pressure water injection service. The method utilizes a backing ring with one beveled end inserted into a beveled end of the first pipe section and the other beveled end of the backing ring projecting from the first section and adapted to mate with a beveled end of the second pipe section. The pipe sections are then cement-mortar lined. The ends of the linings are then cut back and beveled to facilitate alignment and fit-up, and to provide a cavity and anchor for the retention of a heat expanding grout that is applied to both ends of the lined mating pipe sections to seal the joint. A root opening is left between the mated ends to permit weld penetration and fusion of the butted ends of the steel pipe and a space for the excess and expanding grout to protrude internally. The finished joint is strengthened by the backing ring which also facilitates the formation of a uniform butt weld and a cement lining that is free of voids or channels where the linings are joined.

26 Claims, 3 Drawing Sheets

METHOD AND APPARATUS FOR JOINING IN-SITU CEMENT-MORTAR LINED PIPELINES

FIELD OF THE INVENTION

The invention relates to butt welded groove joints in metal pipelines that are cement-mortar lined in-situ. Such pipelines are used, for example, in high pressure water injection service.

BACKGROUND

Cement-mortar lined carbon steel pipe and tubular goods are widely used in utility plants, residential and industrial water gathering and supply piping systems where corrosion is a concern. Pipes of 24" (610 mm) diameter or smaller are commonly joined by either partial penetration butt welding where asbestos gaskets are used to fill the space or gap between the cement-mortar lining of the mating pipe ends, or by use of weldable, threaded, plastic or other specialty couplings, including flanges. While these methods are acceptable for low pressure service (150 psig maximum), they are not acceptable for high pressure water injection service where operating pressures can be on the order of several thousand psig.

Successful and economical in-situ lining of long sections of existing and newly constructed pipelines for high pressure water injection service in the oil and gas industries has mandated the development of a reliable joining method that results in full penetration, good quality (code acceptable) welds and effective joint seals for the concrete lining.

One object of this invention is to provide an improved method for the reproducible fabrication of a high quality field weld and effective seal of tie-in joints for in-situ cement-mortar lined pipelines in high pressure water injection service. Another object of the invention is to achieve such welds economically in terms of both time and materials.

These objectives are achieved by the use of an inexpensive cylindrical carbon steel beveled backing ring of special design to enable full penetration butt welds to be obtained by a pipeline welder of average experience. In addition, the beveled ends of the backing ring function to:

(a) facilitate alignment and fit-up of the mating male and female ends of the cemented pipeline sections;

(b) prevent formation of a stress riser between the end of the backing ring and the adjacent cement-mortar lining; and (c) provide an effective anchor for, and increase the contact surface area of, the grout joint seal.

The adjacent ends of the cement lining are also externally beveled to facilitate an improved sealing of the joint through the use of a heat expanding grout.

SUMMARY OF THE INVENTION

In its broadest aspect, the invention is a method for butt welding the ends of pipe sections of in-situ cement-mortar lined pipelines comprising the use of a beveled internal backing ring and heat expanding grout. The method results in a radiographically acceptable butt weld and a seal that protects the carbon steel groove joint from internal corrosion. The mating ends of the cement-mortar lining are beveled to facilitate retention of a heat expanding grout used to internally seal the weld joint and complete the cement lining.

The method utilizes a cylindrical carbon steel backing ring with at least one, and preferably two beveled ends. The backing ring is inserted approximately halfway into the beveled end of the first pipeline section and tack welded to hold it in position. The adjacent pipeline sections are then in-situ cement-mortar lined. The cement-mortar lining of the second section of pipe is cut back by a distance equal to the projecting end of the backing ring and beveled before the lining is fully cured. This beveling facilitates alignment and fit-up with the first section and generates a cavity and eventual anchor for the retention of the joint seal. The seal is a heat expanding grout that is mixed with water to form a slurry and applied to both ends of the mating cement-mortar lining. The mating pipeline ends are then lined up and fitted together. A root opening or gap of about 0.08" to 0.12" (2 to 3 mm) is left between the mating pipe ends. This root opening ensures full weld penetration and fusion of the butted ends of the steel pipe and leaves a space for the excess and expanding grout to protrude internally on the cement-mortar lining side. The grout is uniformly heated to cure and expand it. The welding step preferably uses a controlled heat-input, downhill welding process, which also provides the heat required to cure the grout.

DETAILED DESCRIPTION OF THE INVENTION

Figure 1A:
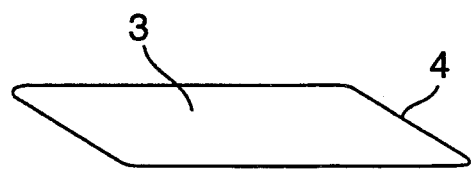
FIG. 1A is a partial cross-sectional view of the backing ring.

An important element in the practice of the method of the invention to obtain the improved butt weld is the configuration of the backing ring, as shown in FIG. 1A. In a preferred embodiment, the backing ring (3) is cylindrical and adapted to fit closely with the pipe sections to be joined, and has an internally beveled end (15) and an externally beveled end (4). It can be fabricated from a section of carbon steel pipe. As will be understood by one skilled in the art, the backing ring is a key element in the improved method, and performs the following functions:

(a) it facilitates the fabrication of a full penetration butt weld by the average pipeline welder;

(b) the internally beveled back edge of the backing ring prevents the formation of a stress riser in the adjacent cement-mortar lining and facilitates easy retrieval of the cement-mortar lining crawler and its cables;

(c) the externally beveled front edge of the backing ring acts as a stabbing guide that enhances alignment and fit-up of the female end of the tie-in joint with that of the male end. It also increases the contact surface area and anchor pattern for the grout joint seal; and (d) compared with all other commonly used joining methods, the use of the backing ring offers the most economical and reliable joining technique for in-situ cement-mortar lined pipelines.

The beveled edges of the cement-mortar lining provide an effective envelope and anchor for the retention and protection of the grout joint seal from erosion during service.

Location of the grout seal at the end of the backing ring at 1" (25 mm) from the weld ensures effective curing of the seal from welding thermal cycles without overheating and embrittling the grout.

Figure 1B:
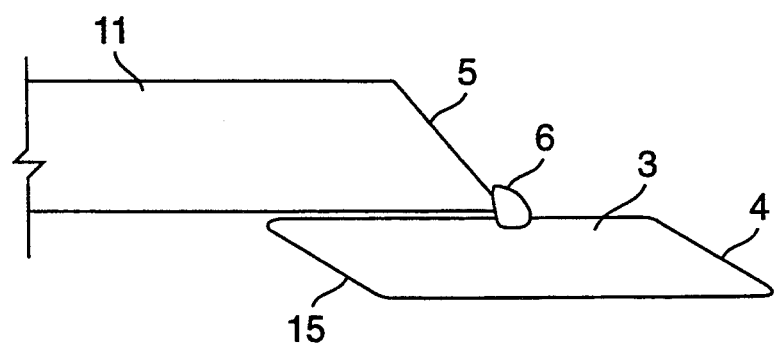
FIG. 1B is a partial cross-sectional view of the first section of pipe and the backing ring showing their relative positions.

FIGS. 1B through 5 illustrate the fabrication sequence used in the method of the invention to obtain the completed joint. In a preferred embodiment, the method can be practiced as follows:

The invention can be used in the installation of new pipe sections, or in the lining of an existing pipeline. The pipeline is cut into sections of optimum length for in situ cement-mortar lining, the pipe ends being cut square. As shown in FIG. 1B, the end of a first section of pipe (11) is externally beveled (5), at an angle from about 25° to 40°, and preferably at an angle of from 30° to 37½° from the vertical. The end of the second section of pipe (8) is similarly beveled. The external bevels are made by forming a conical surface on the outer surface at the end of the pipe. The beveled pipe ends are preferably capped with either plastic or plywood sheathing for protection during the cement coating step.

A 0.08" to 0.25" (2 to 6.4 mm) thick by 2" (50 mm) wide mild carbon steel backing ring (3) is shop fabricated to closely fit within the inside diameter of the first section of pipe (11). The clearance between the backing ring and the pipe is preferably from about 0.01" to 0.05" (0.2 and 1.2 mm) on the diameter. The backing ring is externally beveled (4) on at least one end, and in a preferred embodiment, the backing ring is internally beveled (15) at the other end. The internal bevel is made by forming a conical surface on the inner surface at the end of the ring. The angle of the bevels on the backing ring is preferably between 25° and 45° from horizontal. The backing ring is fitted to a depth of about half of its width into the pipe end and tack welded (6) at three or more spaced locations. A suitable weld for mild carbon steel can be obtained using 3/32" (2.4 mm) diameter E6010 coated welding electrode.

Figure 2:
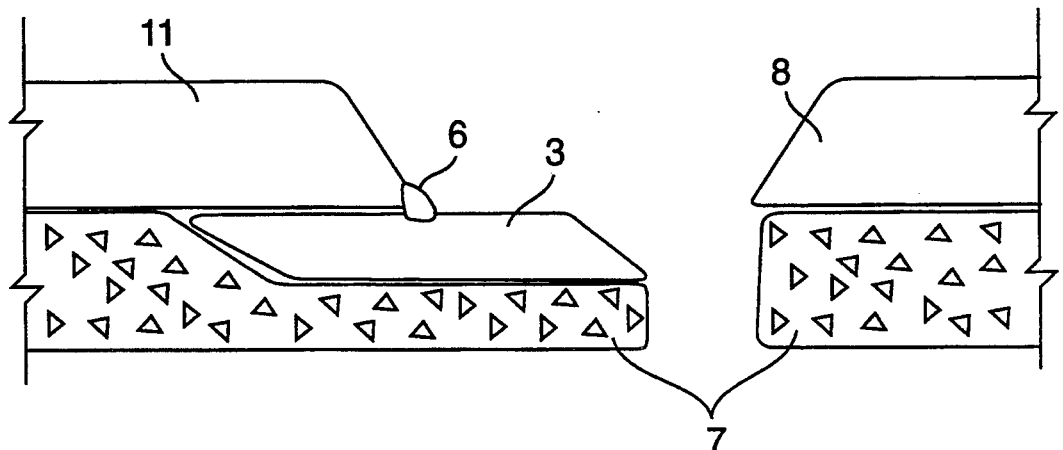
FIG. 2 is a partial cross-sectional view of the pipe sections showing the cement lining applied.

The pipeline sections (1,8) are in-situ cement-mortar lined using a conventional crawler cement-mortar lining machine (not shown). As shown in FIG. 2, cement-mortar lining (7) extends to the edge of the beveled ends of the pipe (8) and backing ring (4).

Figure 3:
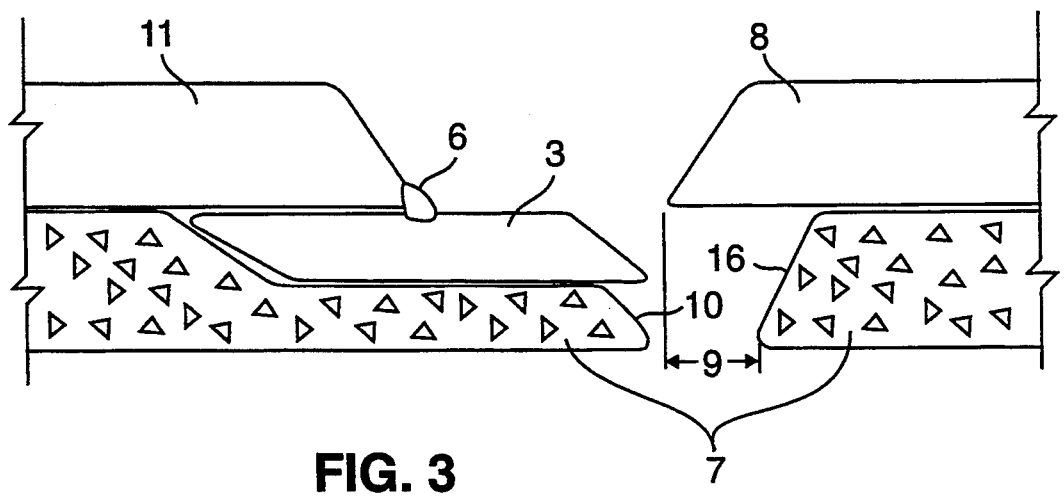
FIG. 3 is a partial cross-sectional view of the pipe sections showing the cement lining beveled.

As shown in FIG. 3, the cement-mortar lining of the second section (8) is cut back to a distance (9) and externally beveled (16) to permit the projecting end (4) of the backing ring (3) to mate with the second section of pipe. In a preferred embodiment this is about one-half of the width of this backing ring. The cement-mortar lining in the first section of pipe is similarly beveled (10) below the exposed end of the backing ring. The width of the lining bevel should extend from about ⅛" to ⅜" (3.2 to 9.5 mm) along the inside surfaces of the pipe and backing ring. Cutting and beveling the cement-mortar lining is preferably performed within three to four (3-4) hours after the lining is applied and before it reaches full cure at eight to ten hours.

Figure 4:
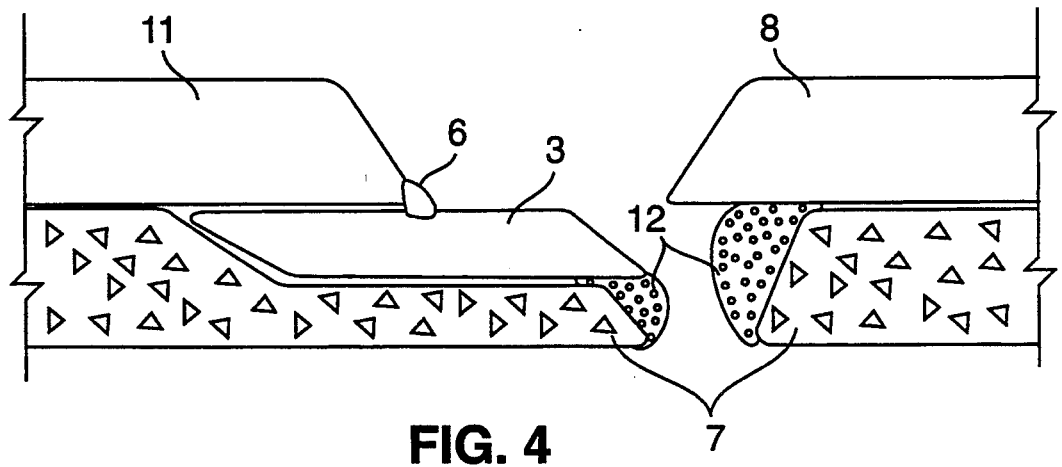
FIG. 4 is a partial cross-sectional view of the pipe sections showing the grout applied.
Figure 5:
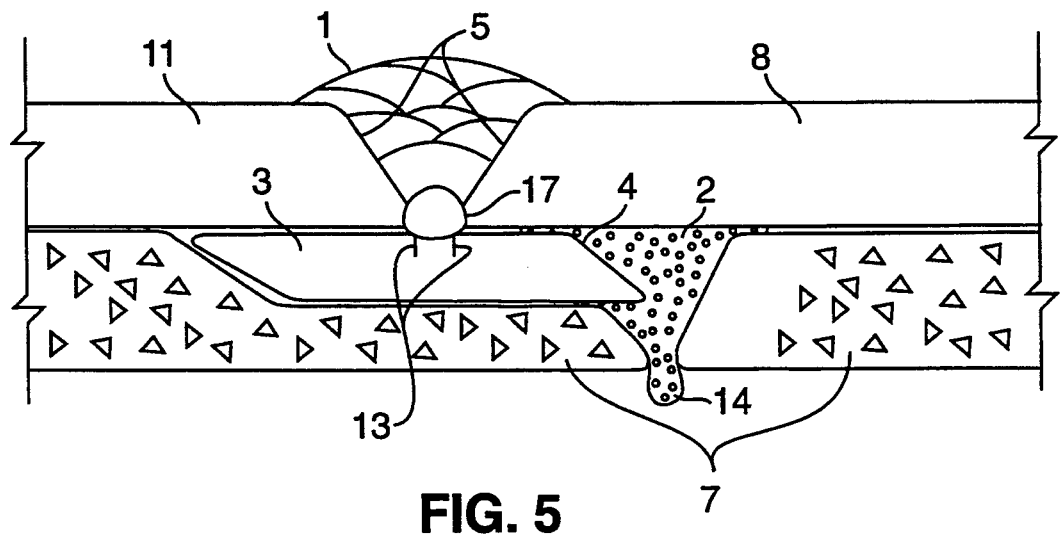
FIG. 5 is a partial cross-sectional view of the complete assembled and welded groove joint.

As shown in FIG. 4, heat expanding grout (12) in the form of a slurry is generously applied to both beveled ends of the fully cured cement-mortar lining. The mating ends of the cemented pipeline are then aligned, moved together and properly fitted as shown in FIG. 5.

A 0.08" to 0.12" (2 to 3 mm) root opening or gap (13) is left between the mating ends. This opening permits full weld penetration and fusion of the butted ends of the steel pipe and leaves a space for the excess and expanding grout (14) to protrude internally on the cement-mortar lining side. The second section of pipe (8) is then tack welded (17) to the backing ring (3).

The heat expanding grout is uniformly heated to a temperature of 230° to 250° F. (110° to 120° C.). The grout should be exposed to the temperature for a minimum of about three minutes to permit expansion and curing of the joint seal (2) as shown in FIG. 5.

The first and second sections of pipe are butt welded preferably using a qualified down-hill welding procedure. For example, for API 5L pipe (grades B through X60), the downhill welding process would utilize a 3/32" (2.4 mm) diameter E6010 welding electrode for the root pass, and a ⅛" (3.2 mm) diameter E7010-G welding electrode for the fill and cap passes, and weld starts and stops should be staggered. The maximum interpass temperature should be controlled to about 300° F. (150° C.).

In a preferred embodiment of the invention, the heat required to cure the grout is provided by the butt-welding operation.

The invention provides an economical and reproducible, full penetration, quality butt weld and an effective seal that protects the carbon steel pipe joint from internal corrosion by fluids passing through the pipeline.

What is claimed is:

1. A method of joining a first and second section of pipe, each section having an externally beveled end, the method comprising the steps of:

partially inserting a backing ring into the end of the first section of pipe, the backing ring adapted to fit closely within the pipes and having at least one externally beveled end, the externally beveled end of the backing ring projecting from the end of the first section of pipe;

tack welding the backing ring to the first section of pipe;

lining the first section of pipe with cement-mortar, the cement-mortar lining terminating proximate the projecting end of the backing ring;

externally beveling the end of the cement-mortar lining of the first section of pipe under the backing ring;

lining the second section of pipe with cement-mortar, the cement-mortar lining terminating proximate the beveled end of the second section of pipe;

externally beveling the end of the cement-mortar lining of the second section of pipe to permit the projecting end of the backing ring to mate with the second section of pipe;

applying a slurry of heat expanding grout and water to the ends of cement-mortar linings of the first and second pipe sections;

positioning the end of the second section of pipe proximate the end of the first section of pipe and over the projecting end of the backing ring, the ends of the first and second sections of pipe being spaced apart to define a root opening;

tack welding the second section of pipe to the backing ring;

heating the grout slurry to cure the heat expanding grout and form a joint seal; and butt welding the externally beveled ends of the first and second pipes about their circumference.

2. The method of claim 1, wherein the heat for curing the expanding grout is provided by the welding of the pipe sections.

3. The method of claim 1, wherein the backing ring also has one internally beveled end.

4. The method of claim 1, wherein the backing ring is at least 2" wide.

5. The method of claim 1, wherein the angle of the bevel on the backing ring is from about 25° to 45° from horizontal.

6. The method of claim 1, wherein the fit between the backing ring and the pipes is between about 0.01" and 0.05" (0.2 and 1.2 mm) clearance on the diameter.

7. The method of claim 1, wherein the root opening is from about 0.08" to 0.12" (2 to 3 mm).

8. The method of claim 1, wherein the external bevels on the ends of the sections of pipe are from about 25° and 40° from vertical.

9. The method of claim 1, wherein the external bevels on the ends of the cement-mortar linings extend from about ⅛" to ⅜" (3.2 to 9.5 mm) along the inside surface of the pipe.

10. The method of claim 1, wherein the weld about the circumference of the pipes is made using a controlled heat-input downhill process.

11. The method of claim 10, wherein the maximum interpass temperature is controlled to 300° F. (150° C.).

12. The method of claim 10, wherein the pipe material is API 5L grades B through X60, and the weld about the circumference of the pipes is made using a 3/32" (2.4 mm) diameter E6010 welding electrode for the root pass, and a maximum of ⅛" (3.2 mm) diameter E7010-G welding electrode for the fill and cap passes.

13. The method of claim 1, wherein at least three tack welds are used to join the backing ring to the pipe sections.

14. The method of claim 1, wherein the backing ring projects one half its width from the end of the first section of pipe, and the end of the cement-mortar lining of the second section of pipe is externally beveled such that the distance from the end of the second section of pipe to the end of the cement-mortar lining is substantially one half the width of the backing ring.

15. The method of claim 1, wherein the backing ring is from about 0.08" to 0.25" (2 to 6.4 mm) thick.

16. The method of claim 1, wherein the backing ring is mild carbon steel.

17. The method of claim 1, wherein the sections of pipe are lined using a crawler cement-mortar lining machine.

18. The method of claim 1, wherein the grout slurry is heated uniformly to a temperature of from about 230° to 250° F. (110° to 120° C.) for a minimum of about three minutes.

19. The method of claim 1, wherein the cement-mortar linings of the first and second sections of pipe are beveled before the lining has taken a solid set.

20. A butt welded groove joint in a metal pipeline, the pipeline having an interior surface lining of cement-mortar, the joint comprising:

a first section and second section of pipe, each having externally beveled ends, the pipe sections being aligned with, and spaced apart from each other to define a first root opening;

a cylindrical backing ring positioned concentrically in the ends of the first and second sections of pipe and centered below the first root opening, the end of the backing ring in the second pipe being externally beveled;

where the cement-mortar lining of the first section of pipe terminates in an externally beveled end proximate to and below the beveled end of the backing ring; and where the cement-mortar lining of the second section of pipe terminates in an externally beveled end proximate the beveled end of the backing ring and spaced apart from the beveled end of the cement-mortar lining of the first section of pipe to define a second root opening;

a grout joint seal filling the space defined by the beveled ends of the cement-mortar pipe linings, the projecting beveled end of the backing ring, the interior surface of the second section of pipe, and the second root opening; and an external butt weld joining the beveled ends of the first and second sections of pipe and filling the first root opening.

21. The joint of claim 20, wherein the first and second root openings are from about 0.08" to 0.12" (2 to 3 mm) in width.

22. The joint of claim 20, wherein the external bevels on the ends of the first and second sections of pipe are from 25° and 40° from vertical.

23. The joint of claim 20, wherein the backing ring is at least 2" wide.

24. The joint of claim 20, wherein the backing ring is from about 0.08" to 0.25" (2 to 6.4 mm) thick.

25. The joint of claim 20, wherein the external bevels on the ends of the cement-mortar linings extend from about ⅛" to ⅜" (3.2 to 9.5 mm) along the inside surface of the pipe.

26. The joint of claim 20, wherein the end of the backing ring in the first section of pipe is internally beveled.

* * * * *